US008665067B2

(12) United States Patent
Cristache (10) Patent No.: US 8,665,067 B2
(45) Date of Patent: *Mar. 4, 2014

(54) SYSTEMS AND METHODS FOR OBJECT LOCALIZATION AND PATH IDENTIFICATION BASED ON RFID SENSING (75) Inventor: Lucian Cristache, Redmond, WA (US)

(73) Assignee: Lucomm Technologies, Inc., Bellevue, WA (US)

( * ) Notice: Subject to any disclaimer, the term of this patent is extended or adjusted under 35 U.S.C. 154(b) by 1392 days.

This patent is subject to a terminal disclaimer.

(21) Appl. No.: 11/963,697

(22) Filed: Dec. 21, 2007

(65) Prior Publication Data
US 2009/0027165 A1    Jan. 29, 2009

Related U.S. Application Data (63) Continuation-in-part of application No. 11/829,695, filed on Jul. 27, 2007, now Pat. No. 7,898,419.

(51) Int. Cl.
H04Q 5/22    (2006.01)
H04B 7/00    (2006.01)

(52) U.S. Cl.
USPC ... 340/10.1; 340/10.2; 340/572.1; 340/572.4; 726/2

(58) Field of Classification Search
USPC ............... 340/10.1, 10.2, 572.1–572.4; 726/2
See application file for complete search history.

(56) References Cited

U.S. PATENT DOCUMENTS

| | | | |
|---|---|---|---|
| 6,424,264 B1 | 7/2002 | Giraldin et al. | |
| 6,988,279 B1 * | 1/2006 | Kanevsky | 726/2 |
| 7,119,687 B2 | 10/2006 | Paulsen et al. | |
| 7,123,126 B2 | 10/2006 | Tanaka et al. | |
| 7,138,910 B2 | 11/2006 | Ogawa | |
| 7,138,920 B2 | 11/2006 | Nyfelt | |
| 7,151,454 B2 | 12/2006 | Washington | |
| 7,180,420 B2 | 2/2007 | Maurer | |
| 7,187,288 B2 | 3/2007 | Mendolia et al. | |
| 2001/0040512 A1 | 11/2001 | Hines et al. | |
| 2002/0167408 A1 * | 11/2002 | Trajkovic et al. | 340/573.1 |
| 2004/0021569 A1 | 2/2004 | Lepkofker et al. | |
| 2004/0117079 A1 * | 6/2004 | Hulden | 701/23 |
| 2005/0107934 A1 | 5/2005 | Gudat et al. | |
| 2005/0111647 A1 * | 5/2005 | Mashinsky | 379/210.01 |
| 2005/0208952 A1 | 9/2005 | Dietrich et al. | |
| 2005/0242921 A1 | 11/2005 | Zimmerman et al. | |
| 2006/0022800 A1 * | 2/2006 | Krishna et al. | 340/10.2 |
| 2006/0022801 A1 | 2/2006 | Husak et al. | |
| 2006/0109084 A1 * | 5/2006 | Yarvis | 340/10.1 |
| 2007/0040681 A1 | 2/2007 | Jessup | |

(Continued)

Primary Examiner — Brian Zimmerman
Assistant Examiner — Omer S Khan
(74) Attorney, Agent, or Firm — Lowe Graham Jones PLLC (57) ABSTRACT A networked radio frequency identification system includes a plurality of radio frequency identification (RFID) tag readers, a computer in signal communication with the RFID tag readers over a network, and a software module for storage on and operable by the computer that localizes RFID tags based on information received from the RFID tag readers using a network model having endpoints and oriented links. In an additional example, at least one of the RFID tag readers includes an adjustable configuration setting selected from RF signal strength, antenna gain, antenna polarization, and antenna orientation. In a further aspect, the system localizes RFID tags based on hierarchical threshold limit calculations. In an additional aspect, the system controls a locking device associated with an access point based on localization of an authorized RFID tag at the access point and reception of additional authorizing information from an input device.

6 Claims, 5 Drawing Sheets

(56) References Cited

U.S. PATENT DOCUMENTS

| | | |
|---|---|---|
| 2007/0082613 A1 | 4/2007 | Cox |
| 2007/0099623 A1 | 5/2007 | Stephensen et al. |
| 2007/0257775 A1* | 11/2007 | Nishijima .................... 340/10.1 |
| 2007/0273525 A1 | 11/2007 | Garber et al. |
| 2008/0165058 A1* | 7/2008 | Ayachitula et al. ........... 342/359 |
| 2009/0012882 A1* | 1/2009 | Sarangapani et al. .......... 705/28 |

* cited by examiner

SYSTEMS AND METHODS FOR OBJECT LOCALIZATION AND PATH IDENTIFICATION BASED ON RFID SENSING

PRIORITY CLAIM

This application is a continuation-in-part of prior U.S. application Ser. No. 11/829,695 filed Jul. 27, 2007.

FIELD OF THE INVENTION

This invention relates generally to object localization and path identification and, more specifically, to object localization and path identification based on radio frequency identification (RFID) sensing.

BACKGROUND OF THE INVENTION

Systems and methods for localizing objects using RFID sensing tend to be limited to simple location determination and do not typically allow for dynamic sensing reconfiguration based on varying application demands.

SUMMARY OF THE INVENTION

In one example, the present invention comprises a networked radio frequency identification system that includes a plurality of radio frequency identification (RFID) tag readers, a computer in signal communication with the RFID tag readers over a network, and a software module for storage on and operable by the computer that localizes RFID tags based on information received from the RFID tag readers using a network model having endpoints and oriented links.

In accordance with an additional example of the invention, the software module is configured to determine a semantic attribute of RFID tag movement. In one example, the semantic attribute is selected from movement into or out of a previously defined area.

In accordance with an additional example of the invention, the software module is configured to restrict or allow access to an access point to authorized RFID tags (access control). In one example, the software module accepts time intervals from a user along with access restriction/authorization rules associated with the time intervals as well as identification information related to the RFID tags or groups of RFID tags to be restricted/authorized. The software module restricts/authorizes access based on the time intervals, their associated access restriction/authorization rules, and the RFID tag information. Access points include, for example, access doors, barriers, and access gates. In addition, tracking points within an area may also be monitored.

In accordance with further examples of the invention, at least one of the RFID tag readers includes an adjustable configuration setting selected from RF signal strength, antenna gain, antenna polarization, and antenna orientation. In one example, the software module adjusts the adjustable configuration setting based on input from a user. However, the software module may also adjust the configuration setting based on other configuration settings or based on computed values during runtime. In an additional example, the software module is configured to accept time intervals from a user along with security levels that are associated with the time intervals and the software module adjusts the configuration setting based on the time intervals and their associated security levels.

In accordance with other examples of the invention, the system localizes RFID tags based on information received from the RFID tag readers using hierarchical threshold limit calculations. In one example, the hierarchical threshold limit calculations are based on accumulated reading factors from groups of settings for the RFID tag readers. In an additional example, the software module is configured to collect data for each setting of the RFID tag readers during an interval of time and calculate an aggregate result for each RFID tag reader based on an algorithm that uses a weighting function that includes $W_{k,1}$ and $NR_{k,1}$ as parameters where $NR_{k,1}$ represents the number of RFID tag readings at an interrogator 'k' configured with a setting '1' and $W_{k,1}$ represents a weighting factor assigned to the interrogator 'k' configured with the setting '1', and the algorithm spans all settings '1' for the interrogator 'k'. The software module in this additional example is further configured to aggregate the calculated aggregate results based on a second weighting function to determine an aggregation result for an endpoint and compare the aggregation result for the endpoint to at least one of a threshold value or threshold interval to determine whether the RFID tag is localized at the endpoint.

In accordance with further examples of the invention, the hierarchical threshold limit calculations are based on accumulated reading factors from settings of groups of RFID tag readers. In one example, the software module is configured to collect data for each group setting of a group of RFID tag readers during an interval of time and calculate an aggregate result for each group setting based on an algorithm that uses a weighting function that includes $W_{k,1}$ and $NR_{k,1}$ as parameters where $NR_{k,1}$ represents the number of RFID tag readings at an interrogator 'k' configured with a group setting '1' and $W_{k,1}$ represents a weighting factor assigned to the interrogator 'k' configured with the group setting '1', and the algorithm spans all group settings '1' for the interrogator 'k'. The software module in this example is further configured to aggregate the calculated aggregate results based on a second weighting function to determine an aggregation result for an endpoint and compare the aggregation result for the endpoint to at least one of a threshold value or threshold interval to determine whether the RFID tag is localized at the endpoint.

In accordance with yet other examples of the invention, the system localizes RFID tags based on information received from the RFID tag readers using probabilistic threshold calculations. In one example, the probabilistic threshold calculations are based on accumulated probabilities from groups of settings for RFID tag readers. In an additional example, the software module is configured to collect data for each setting of the RFID tag readers during an interval of time and calculate an aggregate result for each RFID tag reader based on an algorithm that uses a weighting function that includes $W_{k,1}$ and $P_{k,1}$ as parameters where $P_{k,1}=PF_{k,1}(NR_{k,1}, C_{k,1})$ is the probability that the RFID tag is at endpoint $E_i$ as detected from interrogator 'k' with settings '1' calculated with the function $PF_{k,1}$ with $NR_{k,1}$ representing the number of RFID tag readings at interrogator 'k' configured with settings '1' and $C_{k,1}$ representing a reference reading value for interrogator 'k' configured with settings '1' and where $W_{k,1}$ represents a weighting factor assigned to the interrogator 'k' configured with the settings '1', and the algorithm spans all settings '1' for the interrogator 'k'. The software module in this additional example is further configured to aggregate the calculated aggregate results based on a second weighting function to determine an aggregation result for an endpoint and compare the aggregation result for the endpoint to at least one of a threshold value or threshold interval to determine whether the RFID tag is localized at the endpoint.

In accordance with additional examples of the invention, the probabilistic threshold calculations are based on accumulated probabilities from settings of groups of RFID tag readers. In one example, the software module is configured to collect data for each group setting of a group of RFID tag readers during an interval of time and calculate an aggregate result for each group setting based on an algorithm that uses a weighting function that includes $W_{k,1}$ and $P_{k,1}$ as parameters where $P_{k,1}=PF_{k,1}(NR_{k,1}, C_{k,1})$ is the probability that the RFID tag is at endpoint $E_t$ as detected from interrogator 'k' with group settings '1' calculated with the function $PF_{k,1}$ with $NR_{k,1}$ representing the number of RFID tag readings at interrogator 'k' configured with group settings '1' and $C_{k,1}$ representing a reference reading value for interrogator 'k' configured with group settings '1' and where $W_{k,1}$ represents a weighting factor assigned to the interrogator 'k' configured with the group settings '1', and the algorithm spans all group settings '1' for the interrogator 'k'. The software module in this example is further configured to aggregate the calculated aggregate results based on a second weighting function to determine an aggregation result for an endpoint and compare the aggregation result for the endpoint to at least one of a threshold value or threshold interval to determine whether the RFID tag is localized at the endpoint.

In accordance with still further examples of the invention, the system includes a plurality of radio frequency identification (RFID) tag readers, a computer in signal communication with the plurality of RFID tag readers over a network, a locking device associated with an access point, the locking device in signal communication with the computer, an input device in signal communication with the computer, and a software module for storage on and operable by the computer. In some embodiments, multiple access points may be included and multiple locking devices and/or input devices may be associated with each access point. In one example, the software module localizes an authorized RFID tag at the access point based on information received from at least one of the plurality of RFID tag readers, receives additional authorizing information from the input device, and sends an unlock signal to the locking device based on the localization of the authorized RFID tag at the access point and the additional authorizing information.

In accordance with yet other examples of the invention, the input device includes a keypad and the additional authorizing information includes an access code. In some embodiments, the input device may include a keypad terminal, a computer, a touchscreen, or other components.

In accordance with still another example of the invention, the input device includes a mobile communications device, the software module is configured to send a request for an access code to the mobile communications device after the authorized RFID tag is localized at the access point, and the additional authorizing information includes the requested access code transmitted from the mobile communications device. In another example, the additional authorizing information may be received by the software module before the RFID tag is localized. The authorization message received from the mobile device may be valid for a predefined period of time, for example during which the RFID tag would need to be localized at the access point for an unlock signal to be sent to a locking device associated with the access point. In still another example, rather than an access code being received from the mobile device, an empty message might be received from a phone number associated with the mobile device, with the authorizing information being the phone number of the message itself.

In accordance with still another example of the invention, the input device includes a location enabled mobile communications device with global positioning system (GPS) capability, the software module is configured to receive or retrieve the location information from the mobile communications device after the authorized RFID tag is localized at the access point, and the additional authorizing information is computed based on the location information received from the mobile communications device.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
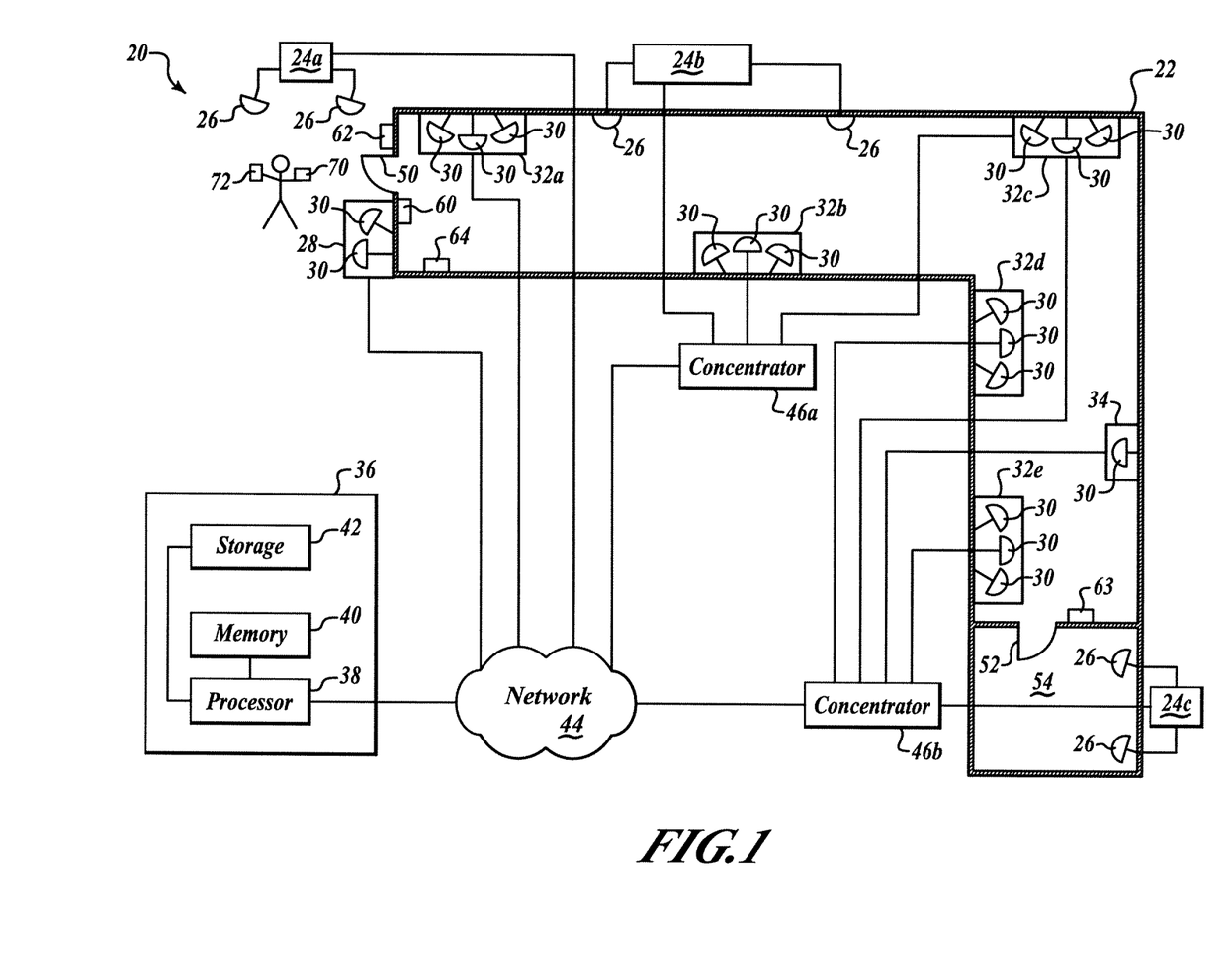
FIG. 1 is a diagram illustrating an environmental view of a system formed in accordance with an embodiment of the invention that is installed in a structure.

FIG. 1 is a block diagram showing an environmental view of a system 20 formed in accordance with an embodiment of the invention that is installed in a structure 22. Although a transceiver is preferred, a separate transmitter and receiver may alternatively serve as a transceiver within the scope of this invention.

The system 20 includes a plurality of radio frequency (RF) readers, each of which is associated with at least one interrogator. Each interrogator includes a transceiver and an antenna. Each interrogator (including transceiver and antenna) or only the interrogator's antenna may be external to the associated RF reader or embedded within the RF reader. The system 20 as shown includes three RF readers 24a, 24b, and 24c, each of which include two interrogators 26 that have antennas external to the RF readers 24a, 24b, and 24c. Transceiver components (not shown) of the interrogators 26 are embedded within the RF readers 24a, 24b, and 24c and are in signal communication with their associated antennas. Although the interrogators 26 are numbered the same, they might have differing technical characteristics in some embodiments. The system 20 also includes an RF reader 28 that has two embedded interrogators 30, five RF readers 32a, 32b, 32c, 32d, and 32e that each has three embedded interrogators 30, and an RF reader 34 that has one embedded interrogator 30.

The system 20 also includes a computer 36 that has a processor 38 in data communication with a memory unit 40 and a storage device 42 also in data communication with the processor 38. In an example embodiment, the computer 36 is an application and database server. Additional computers or computer banks are also present in some embodiments. The computer 36 is in signal communication with a network 44. The network 44 is a wired network in an example embodiment, but is a wireless network in other embodiments. The RF readers 24a, 28, and 32a are also in signal communication with the network 44. The RF readers 24b, 32b, and 32c are in signal communication with a concentrator 46a. A concentrator is a computer that handles a set of RF readers and that may control parameters or settings of interrogators associated with any RF readers the concentrator handles. A concentrator may also issue commands to access doors and/or locking devices and receive feedback from them. The concentrator 46a is also in signal communication with the network 44. The RF readers 24c, 32c, 32d, 32e, and 34 are in signal communication with a concentrator 46b that is also in signal communication with the network 44.

In the example shown in FIG. 1, the RF readers 24a and 28 are positioned outside an entrance to the structure 22. A door 50 located at the entrance leads to a first end of a first hallway within the structure 22. The RF readers 32a and 32b are positioned along the first hallway within the structure 22. The RF reader 24b is shown outside the structure 22, but the antennas of the interrogators 26 associated with the RF reader 24b are positioned along the first hallway within the structure 22. The RF reader 32c is positioned toward a second end of the first hallway, but is also positioned at a first end of a second hallway within the structure 22 that is oriented at a right angle to the first hallway. The RF readers 32d, 32e, and 34 are positioned along the second hallway within the structure 22. A door 52 is located at a second end of the second hallway. The door 52 controls access to a room 54 located within the structure 22. The antennas of the interrogators 26 associated with the RF reader 24c are positioned within the room 54. Although a specific configuration of RF readers, concentrators, and interrogators is shown, it should be understood that alternative configurations are used in other embodiments. Some embodiments do not use concentrators, for example. Other embodiments have the readers and/or the concentrators connected point to point in a mesh topology.

The system 20 also includes a locking device 60 that is associated with the door 50. The locking device 60 is in signal communication with the computer 36 over the network 44 (connection not shown) and is selectively locked and unlocked based on information received at the computer 36 from RF readers positioned near the door 50. Although the locking device 60 is controlled by the computer 36 in this embodiment, in other embodiments the locking device 60 is in signal communication with one or more RF readers or one or more concentrators that control the locking device 60 in a decentralized fashion. A locking device 63, similar to the locking device 60, is associated with the door 52 so that the system 20 is able to selectively control access to the room 54. A first input device 62, such as a keypad or touchscreen for example, is positioned outside the structure 22 near the door 50. The first input device 62 is in signal communication with the computer 36 over the network 44 (connection not shown). In some embodiments, the input device 62 is connected to a concentrator or to a computer (not shown) other than the computer 36. A second input device 64, such as a keypad or touchscreen for example, is positioned inside the structure 22 near the door 50. The second input device 64 is in signal communication with the computer 36 over the network 44 (connection not shown). In some embodiments, the input device 64 is connected to a concentrator or to a computer (not shown) other than the computer 36.

The system 20 is configured to work with one or more RFID tags 70 that typically include unique identifiers and may include other information. In an example embodiment, an RFID tag 70 is carried by a person that travels into, out of, and within the structure 22. However, in other embodiments, RFID tags are also associated with non-human objects. The RFID tags may also be embedded in cards, clothing, devices, vehicles, or other objects in some embodiments. In one embodiment, the RFID tag 70 is a passive RFID device. However, other embodiments may be configured to locate non-passive RFID devices. The system 20 is also configured to interact with a mobile communications device 72 in some embodiments. In one example, a software module localizes an authorized RFID tag at an access point such as the door 50 based on information received from at least one of the plurality of RFID tag readers, receives additional authorizing information from an input device, and sends an unlock signal to a locking device such as the locking device 60 based on the localization of the authorized RFID tag at the access point and the additional authorizing information. Since RFID tags recognized by the system typically include unique identifiers, different levels of access can be assigned to users or groups of users that have been assigned particular RFID tags. In one example, the additional authorizing information includes an access code received at an input device such as the first input device 62. In an additional example, the additional authorizing information includes an access code first transmitted to a mobile communications device such as the device 72 by the system 20 which is then entered at the first input device 62. In an additional example, an access code is entered into the device 72 and transmitted to the system 20.

One exemplary manner of operation is as follows. Once the RFID tag 70 is detected near the door 50, an appropriate signal is sent to the computer 36. In some embodiments, the tag 70 might also have associated access control rules at the door 50. Separately, the user associated with the tag 70 may send a signal via email or cell phone (for example) that is received at the computer 36 over a network such as an external phone or data network (not shown). The computer 36 searches one or more stored databases of RFID data and compares the stored data with the received secondary signals. For example, the RFID tag 70 may be paired with a cell call from a specific phone number, or receipt of an email from a particular email address with "unlock" or other known subject headers. If both the RFID tag 70 is sensed and the secondary access code or message is received, the door 50 is caused to be unlocked by the computer 36. If the RFID tag 70 is sensed but no code received, the computer 36 may automatically send an email, text message, or other signal to the user associated with the tag 70 to prompt the user to send the secondary access code.

A second exemplary manner of operation is as follows. Once the RFID tag 70 is detected near the door 50, an appropriate signal is sent to the computer 36. Separately, the user associated with the tag 70 may have a location enabled device that provides global location information such as GPS coordinates that is received at the computer 36 over a network such as an external phone or data network (not shown). The computer 36 compares the location information from the mobile device to the location of the detected RFID tag and if the locations are close to one another (within a predetermined range), the door 50 is unlocked by the computer 36. If the RFID tag 70 is sensed but no mobile device location is received or can be retrieved, or the locations don't match within the predetermined range, the computer 36 may automatically send an email, text message, or other alarm signal to the user associated with the tag 70 or to other personnel.

Typically, subjects that include employees, visitors, assets, cars, and other objects are assigned an RFID tag that is used to identify it to the system 20.

Figure 2A:
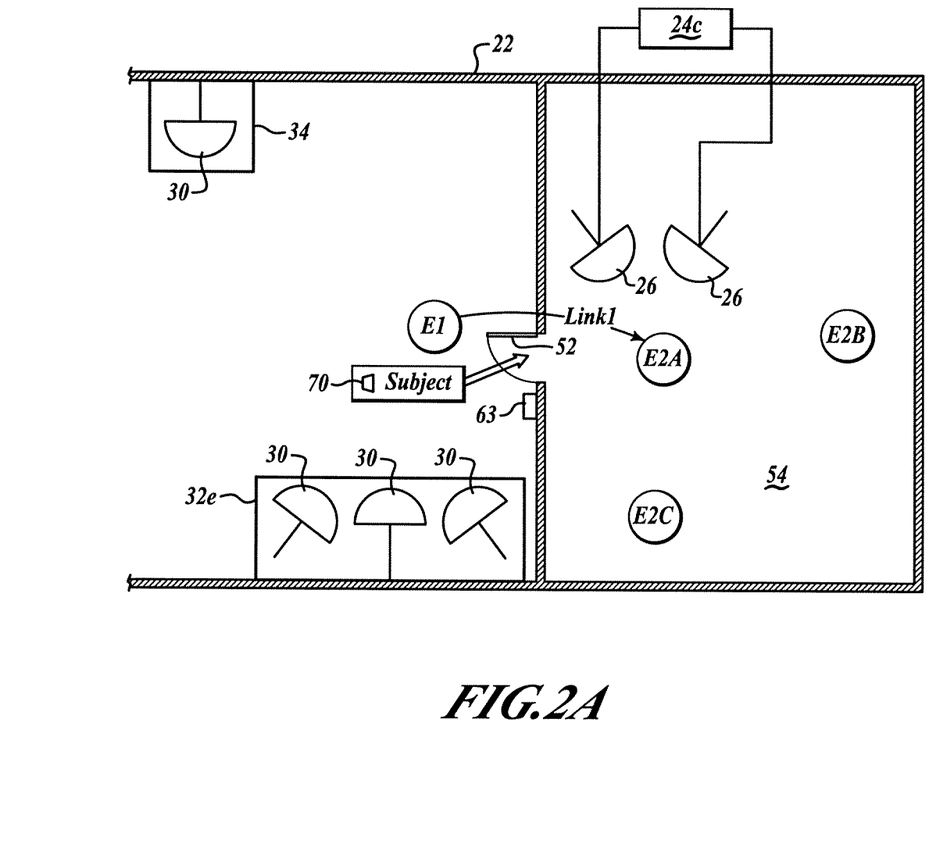
FIGS. 2A and 2B are diagrams showing additional detail for a portion of FIG. 1.
Figure 2B:
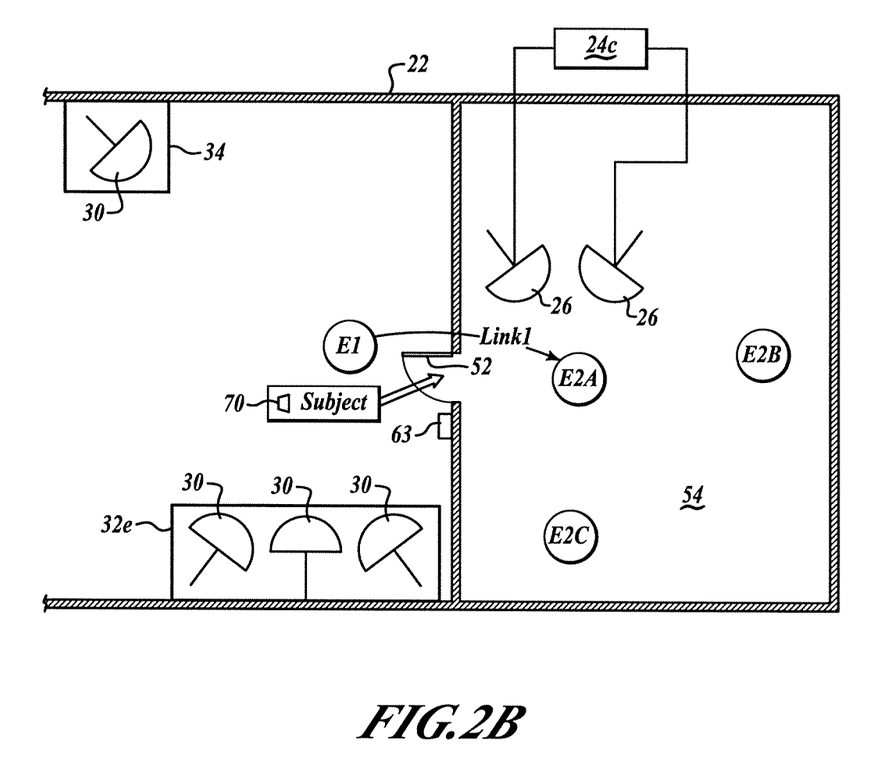

FIGS. 2A and 2B are diagrams showing additional detail for a portion of the system 20 and the structure 22 near the room 54 in an example embodiment. The RF readers 32e and 34 are shown, as well as the antennas of the interrogators 26 associated with the RF reader 24c. A subject with an RFID tag 70 is shown outside the room 54 near the door 52. As the tag 70 is detected by the RF readers 32e and 34, the system 20 indicates that the subject is at a first endpoint, designated as E1. In FIG. 2A, the antenna of interrogator 30 associated with the reader 34 is oriented at approximately a 90 degree angle from the wall to which the reader 34 is attached. FIG. 2B is substantially similar to FIG. 2A, except that the antenna of the interrogator 30 associated with the reader 34 is oriented at approximately a 45 degree angle from the wall to which the reader 34 is attached such that the antenna points in the general direction of E1. Movement of the tag 70 into the room 54 causes the RF reader 24c to detect the tag 70, at which time the system 20 indicates that the subject is at a second endpoint designated as E2A. The system also indicates that the tag just moved from E1 to E2A with an identifier designated as Link1. Additional movement of the tag 70 within the room 54 is also tracked by the RF reader 24c such that the subject and tag 70 may be identified as being associated with an additional endpoint E2B or E2C (links to other endpoints not shown) as they move about the room 54.

Sensing at each endpoint is done using one or more RF interrogators. Each interrogator includes a transceiver and an antenna. The interrogator antennas emit electromagnetic waves generated by the transceiver which, when received by an RFID tag or card, eventually activates the tag or card. Once the tag is activated, it reflects a wave with encoded data that is received by the interrogator. Each interrogator has a number of settings, each with an associated weight. The settings include transmitted RF output power (RF signal strength), antenna gain, antenna polarization and antenna orientation. RF settings may change very rapidly in order to allow a broad range of collection data. The weights associated with the RF settings are used by a localization engine to compute a value using eligibility calculations that determines the location of an object in space if it is within a threshold interval associated with a specific location. The localization engine computes collected data received from the interrogators and aggregates the results. The aggregate result is then used to determine the location and movement of subjects.

In the example shown in FIGS. 2A and 2B, the RF reader 24c localizes the tag 70 by transmitting and receiving RF signals using the interrogators 26. Each of the two antennas of the interrogators 26 associated with the RF reader 24c is positioned with a different position and orientation. The received RF signal strength from the tag 70 varies at each of the two interrogators 26 depending on the location of the tag 70 within the room 54 and the current RF settings of each interrogator 26. The number of reads in a predetermined time period at each interrogator 26 also varies depending on similar factors. The localization engine then localizes the tag 70 within the room 54, such at a location associated with E2A, E2B, or E2C based on the received RF signal strength and/or number of reads received at each interrogator 26 for particular RF settings.

FIGS. 3-6 are diagrams illustrating examples of network models in accordance with an embodiment of the invention. Each network model includes one or more endpoints. Each endpoint has an associated physical location or area in space and is represented in the network model as a graph node. Two endpoints and their sequence define an oriented link that is mapped to an oriented link in the graph. The network model may be hierarchical, on multiple levels, in the sense that at a higher level one graph node (endpoint) may represent a collection of nodes (endpoints) of a lower level with better resolution. An installed system is represented as a facility space network model that includes a series of endpoints (nodes) and their connected oriented links. As such, at each level, the facility space network model resembles a spatial graph.

Figure 3:
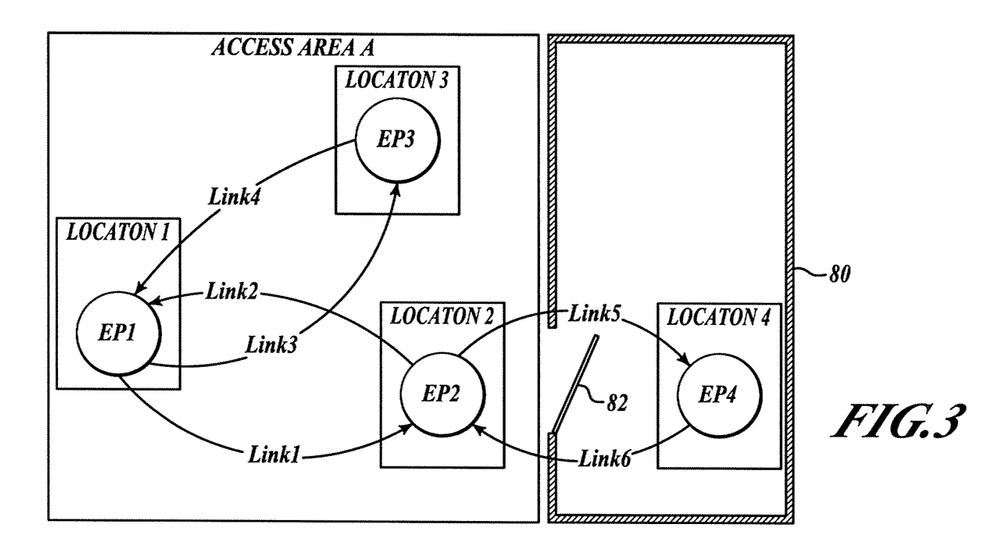
FIGS. 3-6 are diagrams showing examples of network models in accordance with an embodiment of the invention.

With respect to FIG. 3, the diagram includes first, second, third, and fourth endpoints designated as EP1, EP2, EP3, and EP4 respectively. Each of the four endpoints is associated with a corresponding physical location that is labeled as location 1 through location 4 respectively. Oriented links labeled Link1 through Link6 are shown that represent possible paths that an RFID tag could take between spatial locations associated with the endpoints. EP1, EP2, and EP3 are shown within a box labeled Access Area A. In one example, location 4 is inside a room 80 having an entrance with a door 82 (shown partially open) and Access Area A corresponds to an area outside of the room 80 near the door 82. In an example embodiment, a system, such as the system 20 described with respect to FIG. 1 is used to localize an RFID tag within and outside the room 80 at locations one through four and other locations, using RF readers (not shown) in a similar manner to that described with respect to FIGS. 1, 2A, and 2B.

Figure 4:
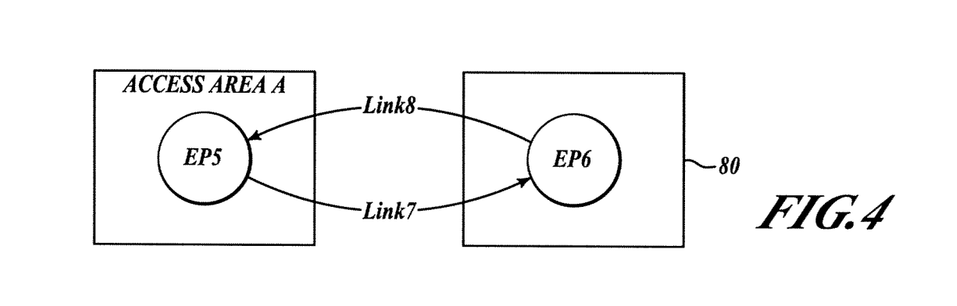

FIG. 4 is an example of a higher level network model used in conjunction with the model represented in FIG. 3 to form a hierarchical network model. FIG. 4 includes a fifth node and a sixth node designated as EP5 and EP6, respectively. EP5 represents all of the nodes EP1, EP2, and EP3, and EP6 represents EP4 and any location inside the room 80 shown in FIG. 3. Oriented links, labeled Link7 and Link8 are shown that represent possible paths that an RFID tag could take between spatial locations associated with EP5 and EP6.

Figure 5:
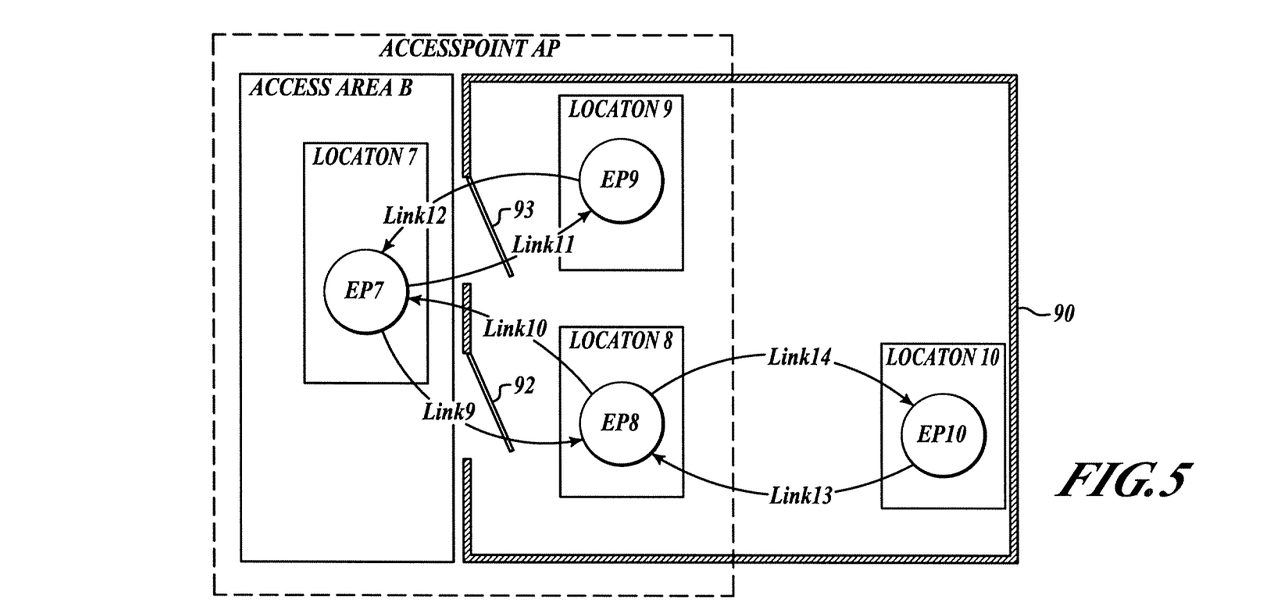

With respect to FIG. 5, the diagram includes first, second, third, and fourth endpoints designated as EP7, EP8, EP9, and EP10 respectively. Each of the four endpoints is associated with a corresponding physical location that is labeled as location 7 through location 10 respectively. Oriented links are shown that represent possible paths that an RFID tag could take between spatial locations associated with the endpoints. EP7 is shown within a box labeled Access Area B. In one example, locations 8, 9 and 10 are inside a room 90 having an entrance with doors 92 and 93 (shown partially open) and Access Area B corresponds to an area outside of the room 90 near the doors 92 and 93. In an example embodiment, a system, such as the system 20 described with respect to FIG. 1 is used to localize an RFID tag within and outside the room 90 at locations seven through ten and other locations, using RF readers (not shown) in a similar manner to that described with respect to FIGS. 1, 2A, and 2B.

Figure 6:
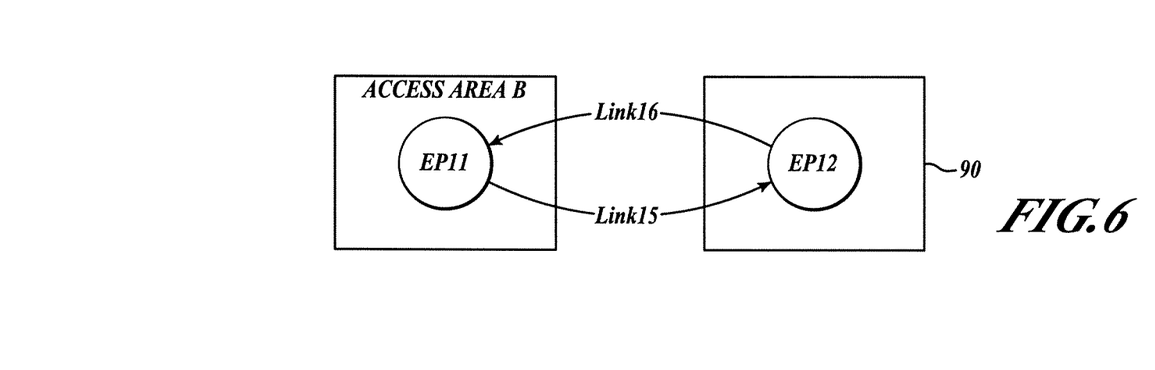

FIG. 6 is an example of a higher level network model used in conjunction with the model represented in FIG. 5 to form a hierarchical network model. FIG. 6 includes a node designated as EP11 and a node designated as EP12. EP11 represents EP7 and any location inside Access Area B shown in FIG. 5. EP12 represents all of the nodes EP8, EP9, and EP10, and any location inside the room 90. Oriented links, labeled Link15 and Link16 are shown that represent possible paths that an RFID tag could take between spatial locations associated with EP11 and EP12. A hierarchical model such as that represented by FIGS. 5 and 6 allows different semantics of movement to be associated with each level. For example, Link9 and Link11 shown in FIG. 5 might represent semantic attributes of 'IN DOOR 92' and 'IN DOOR 93', respectively while Link15 shown in FIG. 6 might represent 'ENTER ROOM 80'. Although FIG. 6 is one example of a higher level network model corresponding to the model shown in FIG. 5, other models could be used in other embodiments. Additionally, more than two levels may be used in some hierarchical network models.

In an example embodiment, the network model is organized as a graph and a semantic engine computes semantic rules based on attributes of elements in the network model graph. In some embodiments, the network model has a hierarchical structure on multiple levels. Semantic rules are both statically defined and learned by the semantic engine while the system is running in an example embodiment. An example of a statically defined semantic rule is that if a subject with an RFID tag passes an oriented link in the model and that link has an 'IN' attribute associated with it, the semantic engine will interpret that movement as an entrance event into the space represented by the destination node, or, more generally, into a larger space in which the space represented by the destination node is located if the 'IN' attribute includes additional information such as an 'IN' attribute labeled 'INTO ROOM' or 'INTO BUILDING', for example. For example, movement from EP2 to EP4 might represent an entrance event into the room 80, with Link5 having an attribute labeled 'INTO ROOM' associated with it. In this example, the semantic engine would interpret movement of a subject with an RFID tag from EP2 to EP4 as an entrance event into the room 80. This semantic attribute is an indicator of movement from outside the room 80 to inside the room 80, rather than simply an indicator that the detected tag is in the room 80.

Movement into and out of spaces larger than those represented by destination nodes may be identified in other manners in some embodiments. For example, an entrance event into the room 80 may be identified based on Link5 having an attribute labeled 'IN' if location 4 is mapped to the room 80 and the semantic engine uses this mapping along with the 'IN' attribute of Link5 to identify the entrance event. In some embodiments, direction of movement can also be considered to be a semantic event, such as 'walk front to back in a particular area' or 'walk north', for example. In embodiments where a hierarchical network model is used, the semantic engine may use the semantics of any level or combination of levels to identify any semantic events. For example, the semantic of movement from EP2 to EP4 at the level shown in FIG. 3 is of movement from location 2 to location 4. However, at a higher level (as represented in FIG. 4) the movement from EP2 to EP4 maps as a movement from EP5 to EP6 and the semantic might be of entrance into the room 80. Further still, at an even higher level (not represented here) the semantic might be of entrance into a building where the room 80 is located. The semantic engine infers the semantics of an action using the hierarchical model.

Learned semantic rules are determined by the system at runtime using inputs and observations. An example of a learned semantic rule is when a subject with an RFID tag is preparing to leave a building through an access door, but is required by the system to enter the semantics passing through the door before being allowed to pass through the door and consequently a link in the network graph. The subject may specify that it is a break event by using a keypad, touchscreen, or other input device such as the keypad 64 shown in FIG. 2 before passing through the door 50. The semantic engine then determines that passing that link in the network graph represents an exit event (OUT event). In one example, time values are also recorded by the system 20 for some or all localization determinations and semantic attribute determinations. These time values may be stored in association with an identifier associated with an RFID tag that had been localized or that had received a semantic attribute determination. The time values may be set to expire after a certain period of time, may only apply to particular semantic attributes or particular RFID tags, may be stored in a system database and/or log and/or be used to calculate (time) tracking data.

A software module (having an access control engine component) restricts or allows access at an access point based on access control rules associated with elements in the network model graph. Access control rules are based on configuration settings and/or they may be defined by a user and saved in the configuration settings. Access control rules are associated with oriented links or groups of links in the network model. An example of a defined access control rule is that an RFID tag is allowed to pass an oriented link only if it is authorized to do so. In another example, an RFID tag may be authorized to pass an oriented link in the network model only in certain periods of time during a day if the user has defined time restriction intervals on the access path represented by the oriented link. The access control rules might be specific for each RFID tag or group of RFID tags or may be general. The access control rules might also be associated with additional authorization information such as entering an additional access code, mobile device authentication information, or global positioning location matching, for example. In one example, time values are also recorded by the system 20 for some or all access events (lock/unlock/door open) and access control determinations. These time values may be stored in association with an identifier associated with an RFID tag that had been allowed or restricted access. The time values may be set to expire after a certain period of time, may only apply to particular access events or particular RFID tags, may be stored in a system database and/or log and/or used to calculate tracking data.

In one example, the system 20 is configured to localize an RFID tag at an endpoint by using hierarchical threshold limit calculations based on accumulated reading factors from groups of settings for RF interrogators. In one instance, localization of an RFID tag at E2A, E2B, or E2C as shown in FIGS. 2A and 2B could be performed by the RF reader 24c in this manner. In an alternate example, the system 20 is configured to use hierarchical probabilistic threshold calculations based on accumulated probabilities from groups of settings for RF interrogators. In an additional example, the system 20 is configured to use hierarchical threshold limit calculations based on accumulated reading factors from settings of groups of RF interrogators. In a further example, the system 20 is configured to use hierarchical probabilistic threshold calculations based on accumulated probabilities from settings of groups of RF interrogators. Each of the four examples is discussed in greater detail below. In each of the four examples, there are 'n' RF interrogators in the system designated as $RF_1, RF_2 \ldots RF_n$. There are 'm' endpoints defined in a network model, designated as $E_1, E_2 \ldots E_m$. There is one RFID tag in range of the system, and the system validates the tag's location as being at endpoint $E_i$. Although only one RFID tag is discussed for simplicity, it should be understood that multiple RFID tags can be tracked by the system 20.

In the first example, the system uses hierarchical threshold limit calculations based on accumulated reading factors from groups of settings for RF interrogators. In this approach each interrogator has an assigned collection of settings/configurations. For example, $RF_i$ might have an assigned collection including two settings while $RF_j$ might have a collection including five settings, with a setting being defined by values of any of the RF interrogator parameters or a combination of parameters such as transmitted RF power output, antenna gain, antenna polarization, and antenna orientation. There is also a weight associated with each setting of the RF interrogator, designated as $W_{k,1}$ where 'k' is the index for the RF interrogator and '1' is the index for the interrogator's setting. For an endpoint $E_i$, there is a threshold value or interval (TV) used in assessing whether a subject with an RFID tag is located at the endpoint. A threshold value or interval is also used in the other examples, but the particular value or interval may vary in each example.

In an interval of time, the system collects data for each setting of the RF interrogators with $NR_{k,1}$ representing the number of tag readings at the interrogator 'k' configured with the settings '1' during the time interval. In a first step for endpoint $E_i$, the system calculates an aggregate result for each interrogator based on a weighting formula/function: $A_k=F_k$ ($W_{k,1}$, $NR_{k,1}$) where 'k' is the interrogator index and '1' spans all settings for interrogator 'k'. A second step includes aggregating the results obtained in the first step based on a weighting formula/function: $A=G(W_k, A_k)$ where 'k' is the interrogator index and $WA_k$ is the weight associated with the interrogator k at the endpoint $E_i$. The aggregation result A is then compared with the threshold value or interval Tv to assess whether the tag is localized at endpoint $E_i$.

One example implementation of this first example can be described with reference to FIGS. 2A and 2B. The endpoint of interest Ei is E1. A RFID tag located at E1 may be read by all the interrogators 30 and 26. The interrogator 30 in reader 34 is assigned four settings: one setting for which the antenna is oriented as in the FIG. 2A with RF power output 30 dBm, one setting for which the antenna is oriented as in the FIG. 2A with RF power output 27 dBm, one setting for which the antenna is oriented at a 45 degree angle towards E1 as in FIG. 2B with RF power output 30 dBm and one setting for which the antenna is oriented at a 45 degree angle towards E1 as in FIG. 2B with RF power output 27 dBm. The antenna of the interrogator 30 associated with the reader 34 has vertical polarization. All the other interrogators have just one setting, with the antennas' orientations as shown in FIG. 2A and an RF power output of 27 dBm. All the interrogators' antennas have a fixed gain of 6 dBi. The interrogators 30 in the reader 32e have different antenna polarizations, one vertical, one horizontal and one circular. The first two settings of the interrogator 30 associated with the reader 34, corresponding to the antenna orientation shown in FIG. 2A, are assigned negative weights W1,1=(−0.4) and W1,2=(−0.5) because the antenna is vertically polarized and does not point toward E1, in such a way that it detects tags located away from E1. For the next two settings, the weights are higher and set at W1,3=0.5 and W1,4=0.4 respectively, because the antenna points toward EP1 and detects tags around EP1.

While the antennas may be oriented in a physical manner that directs them in an angular fashion such that they point toward a desired direction, it should be understood that they may alternatively (or in addition) be electronically steerable to encompass a preferred field of view.

The first two settings of the interrogator 30 associated with the reader 34 are used to detect that the tag is not likely at endpoint E1 but rather in the coverage area for this setting away from E1, because the interrogator antenna is oriented away from the location of E1; hence these settings have associated negative weights. For all the interrogators in reader 32e, there is a single setting with a weight of 0.8 (W2,1, W3,1, W4,1 are all 0.8). For E1, all the interrogators in reader 24c have null weights(0). The weights are calculated and determined using site surveys and simulations, for example. Weights associated with other functions and examples are determined in a similar fashion.

During an interval of time, such as 1 ms for example, the system collects data from all settings from all readers. For the interrogator 30 associated with the reader 34, it collects reading values for each setting and aggregates the values using an aggregation function. The aggregation function(F) for each interrogator for this example may be viewed as a sum of weights applied to the number of tag reads. In other examples, the aggregation functions for each interrogator might be different from each other. For the interrogator 30 associated with the reader 34, the readings are N1,1=16, N1,2=10, N1,3=2 and N1,4=0. For the interrogator 30 associated with the reader 34, the aggregate value becomes A1=W1,1*N1,1+W1,2*N1,2+W1,3*N1,3+W1,4*N1,4=(−0.4)*16+(−0.5)*10+0.5*2+0.4*0~(−10.4). For the three interrogators 30 associated with the reader 32e, the system collects one reading value N2,1=4, N3,1=2 and N4,1=0, respectively, with the not null readings coming from horizontally and circularly polarized antennas. The aggregate values for the interrogators 30 associated with the reader 32e become A2=W2,1*N2,1=0.8*4=3.2, A3=W3,1*N3,1=0.8*2=1.6 and A4=W4,1*N4,1=0.8*0=0, respectively. For the interrogators 26 associated with the reader 24c, the collected data doesn't matter in this example calculation because the weights associated with the interrogators 26 are null (in this example those interrogators are not taken into consideration while calculating position at E1). The final result is then computed as an aggregation of the particular results normalized with the weight associated with each interrogator.

The final aggregation function(G) for this example is a sum of the weights applied to the aggregated values for each interrogator from the previous step. In this example, the interrogator 30 associated with the reader 34 is assigned a weight of WA1=0.5, the interrogators 30 associated with the reader 32e each have a weight of 0.6 (WA2, WA3, WA4 are all 0.6), and as mentioned above all the other interrogators have null weights. Using these weights, the final aggregate value become A=WA1*A1+WA2*A2+WA3*A3+WA4*A4=0.5*(−10.4)+0.6*3.2+0.6*1.6+0.6*0~(−2.32). This value is compared with a previously determined threshold value Tv=1 which is assigned to E1. In this example, the threshold value is not reached which means that the subject is not in endpoint E1.

In the second example, the system uses hierarchical probabilistic threshold calculations based on accumulated probabilities from groups of settings for RF interrogators. This calculation is very similar with the previous one, except that in the first step of the calculations, weights are applied to a probability. For each interrogator setting there is a reference reading value that expresses the highest probability that the tag may be at endpoint $E_i$. This is represented as $C_{k,1}$ where 'k' is the index for the RF interrogator and '1' is the index for the interrogator's setting. In a first step for endpoint $E_i$, the system calculates an aggregate result for each interrogator based on a weighting formula/function: $A_k=F_k(W_{k,1}, P_{k,1})$ where 'k' is the interrogator index, '1' spans all settings for interrogator 'k' and $P_{k,1}=PF_{k,1}(NR_{k,1}, C_{k,1})$ is the probability that the tag is at endpoint $E_i$ as detected from interrogator 'k' in configuration '1' calculated with the function $PF_{k,1}$. A second step includes aggregating the results obtained in the first step based on a weighting formula/function: $A=G(WA_k, A_k)$ where 'k' is the interrogator index and $WA_k$ is a weight associated with the interrogator 'k' at the endpoint $E_i$. The aggregation result A is then compared with a threshold value or interval Tv to assess whether the tag is localized at endpoint $E_i$.

An example implementation of this second example can be described with reference to FIGS. 2A and 2B. The endpoint of interest Ei is E1. A RFID tag located at EP1 may be read by all the interrogators 30 and 26. In this example, the interrogator 30 associated with the reader 34 is assigned four settings: one setting for which the antenna is oriented as shown in FIG. 2A with an RF power output of 30 dBm, one setting for which the antenna is oriented as shown in FIG. 2A with RF power output 27 dBm, one setting for which the antenna is oriented at a 45 degree angle towards E1 as shown in FIG. 2B with RF power output 30 dBm, and one setting for which the antenna is oriented at a 45 degree angle towards E1 as shown in FIG. 2B, with RF power output 27 dBm. For all settings, the antenna of the interrogator 30 associated with the reader 34 has vertical polarization. All of the other interrogators have just one setting, with the antenna orientation as shown in FIG. 2A, and an RF power output of 27 dBm. All of the interrogators' antennas have a fixed gain of 6 dBi. The interrogators 30 associated with the reader 32e have different antenna polarizations, one vertical, one horizontal and one circular.

The first two settings of the antenna of the interrogator 30 associated with the reader 34 correspond to the antenna orientation as shown in FIG. 2A, and are assigned weights of W1,1=0.5 and W1,2=0.5. The reference reading values are low values of C1,1=1 and C1,2=0 because the antenna is vertically polarized and does not point toward EP1, such that it detects tags located away from E1. For the next two settings, the weights are higher W1,3=1 and W1,4=0.9 respectively and the reference reading values are higher values of C1,3=10 and C1,4=9, because the antenna points toward E1 and detects tags located near E1. For all of the interrogators 30 associated with the reader 32e, there is a single setting with a weight of 0.9 (W2,1, W3,1, W4,1 are all 0.9) with a reference reading value of 12 (C2,1, C3,1, C4,1 are all 12). For E1, all of the interrogators 26 associated with the reader 24c have null weights(0). The weights and the reference reading values are calculated and determined using site surveys and simulations, for example.

During an interval of time, such as 1 ms for example, the system collects data from all interrogators for all settings. For the interrogator 30 associated with the reader 34, the system collects reading values for each setting and aggregates the values using an aggregation function. The aggregation function(F) for each interrogator for this example is the average of the weights applied to the probability that the tag is at the endpoint E1 for each interrogator setting. The probability that the RFID tag is at endpoint E1 for each interrogator setting is computed based on a probability function P(N, C) which in this example is: for the first two settings of the interrogator 30 associated with the reader 34 (P1,1, P1,2)={0 if N>C, 0.5 if N<=C}; for the last two settings of the interrogator 30 associated with the reader 34 (P1,3, P1,4)={0 if N=0, C/N if N>C, N/C if N<=C}; and for all settings of the interrogators 30 associated with the reader 32e (P2,1, P3,1, P4,1)={0 if N=0, C/N if N>C, N/C if N<=C}. For the interrogator 30 associated with the reader 34, the readings are N1,1=0, N1,2=0, N1,3=8 and N1,4=7. For the interrogator 30 associated with the reader 34, the aggregate value becomes A1=(W1,1*P1,1+W1,2*P1,2+W1,3*P1,3+W1,4*P1,4)/4=(0.5*0.5+0.5*0.5+1*8/10+0.9*7/9)/4=2/4=0.5. For the three interrogators 30 associated with the reader 32e the system collects three reading values N2,1=14, N3,1=12 and N4,1=6, respectively. The aggregate values for the interrogators 30 associated with the reader 32e become A2=(W2,1*P2,1)/1=0.9*12/14=0.77, A3=(W3,1*P3,1)/1=0.9*12/12=0.9 and A4=(W4,1*P4,1)/1=0.9*6/12=0.45 respectively. For the interrogators 26 associated with the reader 24c, the collected data doesn't matter in this example calculation because the weights associated with the interrogators 26 are null (in this example those interrogators are not taken into consideration while calculating position at E1).

The final result is then computed as an aggregation of the particular results normalized with the weight associated with each interrogator. In this example, the interrogator 30 associated with the reader 34 has a weight of WA1=0.8, the interrogators 30 associated with the reader 32e each have a weight of 0.9(WA2, WA3, WA4 are all 0.9) and, as mentioned above, all the other interrogators have null weights. The final aggregation function (G) for this example is the average of the weights applied to the aggregated values for each interrogator from the previous step. The final aggregate value become A=(WA1*A1+WA2*A2+WA3*A3+WA4*A4)/4=(0.8*0.5+0.9*0.77+0.9*0.9+0.9*0.45)/4=(0.40+0.69+0.81+0.41)/4~0.57. This value is compared with a previously determined threshold value Tv=0.50 which is assigned to E1. In this example, the threshold value is reached which means that the subject is at endpoint E1.

In the third example, the system uses hierarchical threshold limit calculations base on accumulated reading factors from settings of groups of RF interrogators. In this approach a group of interrogators has an assigned collection with any number of settings/configurations. For example, four RF interrogators at an access door might have an assigned collection including two settings, with a setting being defined by the combination of any RF interrogators' parameters such as transmitted RF power output, antenna gain, antenna polarization, and antenna orientation. There is a weight associated with the endpoint $E_i$ for each setting of a group of RF interrogators. There is also a weight associated with each interrogator from the group configured with each of the group settings; this is represented as $W_{k,1}$ where 'k' is the index for an RF interrogator in the group and '1' is the index for the group's setting. In an interval of time, the system collects data for each setting of the group of RF interrogators with $NR_{k,1}$ representing the number of readings at the interrogator 'k' configured with the group setting '1'. In a first step for endpoint $E_i$, the system calculates an aggregate result for each group setting based on a weighting formula/function: $A_1=F_k(W_{k,1}, NR_{k,1})$ where 'k' is the interrogator index in the group and '1' spans all settings for the interrogator group. A second step includes aggregating the results obtained in the first step based on a weighting formula/function: $A=G(WA_1, A_1)$ where '1' is the group setting index and $WA_1$ is a weight associated with the group setting '1' at the endpoint $E_i$. The aggregation result A is then compared with a threshold value/interval Tv to assess whether the tag is localized at endpoint $E_i$.

An example implementation of this third example can be described with reference to FIGS. 2A and 2B. The endpoint of interest Ei is E1. A RFID tag located at E1 may be read by all the interrogators 30 and 26. All of the interrogators 30 represent a group used to detect whether the subject is at endpoint E1. The group of interrogators includes group settings, which are a collection of particular settings for each interrogator. In this example, two group settings are defined.

The first group setting includes: a setting for the interrogator 30 associated with the reader 34 where the antenna is oriented at a 45 degree angle towards E1 as shown in FIG. 2B, with interrogator RF power output 27 dBm and antenna polarization circular; a setting for each interrogator 30 associated with the reader 32e where the antenna is oriented as in FIG. 2A, with interrogator RF power output 30 dBm and antenna polarization vertical. For this first group setting, the weight associated with the interrogator 30 associated with the reader 34 is W1,1=0.9 and the weights associated with the interrogators 30 associated with the reader 32e(W1,2, W1,3, W1,4) are all 1, which means that all reads from all the interrogators in the group will count during the aggregation calculation for this group setting.

The second group setting includes: a setting for the interrogator 30 associated with the reader 34 where the antenna is oriented as in FIG. 2A, with interrogator RF power output 30 dBm and antenna polarization vertical; the settings for the interrogators 30 associated with the reader 32e don't matter because these interrogators are associated weights of 0 for this group setting and they don't count during the aggregation calculation of this group setting. In this example, the second group setting may help detect that the tag is not likely to be at endpoint E1, but rather in the coverage area for this group setting away from E1 because the only interrogator antenna that counts is oriented away from the location of E1. However, this is just a particular case and should not limit the generality of the algorithm. For the second group setting, the weight associated with the interrogator 30 associated with the reader 34 is a negative value W2,1=−0.9 because the interrogator settings allow detection in an area away from EP1 and the weights associated with the interrogators 30 associated with the reader 32e(W2,2, W2,3, W2,4) are all 0 which means that all the reads from the interrogators 30 associated with the reader 32e will not count during the aggregation calculation for this group setting. In this example, all the interrogators' antennas have a fixed gain of 6 dBi.

In an interval of time, such as 1 ms for example, the system collects data from both group settings: for the first group setting the number of reads at the interrogator 30 associated with the reader 34 is N1,1=2 and for each interrogator 30 associated with the reader 32e, the number of reads are N1,2=0, N1,3=1, N1,4=2, respectively. For the second group setting, the number of reads at the interrogator 30 associated with the reader 34 is N2,1=10 and for each interrogator 30 associated with the reader 32e, the number of reads are N2,2=0, N2,3=1, N2,4=2, respectively. For each group setting, the system aggregates the values using an aggregation function. In this example, the aggregation functions(F) for each group setting can be considered as a sum of weights applied to the number of tag reads for each interrogator in the group. In other examples, the aggregation functions for each group setting might be different from each other.

For the first group setting, the aggregate value becomes A1=W1,1*N1,1+W1,2*N1,2+W1,3*N1,3+W1,4*N1, 4=0.9*2+1*0+1*1+1*2=(4.8). For the second group setting, the aggregate value becomes A2=W2,1*N2,1+W2,2*N2,2+W2,3*N2,3+W2,4*N2,4=(−0.9)*10+0*2+0*1+0*0=(−9). The final aggregation function(G) for this example is the sum of the group settings' weights applied to the aggregated values for each group setting from the previous step. The first group setting is assigned a weight of WA1=0.9 while the second group setting is assigned a weight value of WA2=0.8. Any weight might have a positive or negative value. The final aggregate value become A=WA1*A1+WA2*A2=0.9*4.8+0.8*(−9)=(−2.88). This value is compared with a previously defined threshold value Tv=3 which is assigned to E1. In this example, the threshold value is not reached which means that the subject is not at endpoint E1.

In the fourth example, the system uses hierarchical probabilistic threshold calculations based on accumulated probabilities from settings of groups of RF interrogators. This calculation is very similar to the third example, except that in the first step of the calculations weights are applied to a probability. For each group setting there is an reference reading value that expresses the highest probability that the tag may be at endpoint $E_i$, noted with $C_{k,1}$ where 'k' is the index for an RF interrogator in the group and '1' is the index for the group's setting. In a first step, the system calculates for endpoint $E_i$ an aggregate result for each group setting based on a weighting formula/function: $A_1=F_k(W_{k,1}, P_{k,1})$ where 'k' is the interrogator index in the group, '1' spans all settings for the interrogator group and $P_{k,1}=PF_{k,1}(NR_{k,1}, C_{k,1})$ is the probability that the tag is at endpoint $E_i$ as detected from interrogator 'k' in group configuration '1' calculated with the function $PF_{k,1}$. A second step includes aggregating the results obtained in the first step based on a weighting formula/function: $A=G(WA_1, A_1)$ where '1' is the group setting index and $WA_1$ is a weight associated with the group setting '1' at the endpoint $E_i$. The aggregation result A is then compared with a threshold value/interval Tv to assess whether the tag is localized at endpoint $E_i$. In all of the configurations described with respect to the four examples, the weights and the threshold values including reference reading values can be statically defined and/or computed during execution using a learning algorithm.

An example implementation of this fourth example can be described with reference to FIGS. 2A and 2B. The endpoint of interest Ei is E1. A RFID tag located at E1 may be read by all the interrogators 30 and 26. All of the interrogators 30 represent a group used to detect whether the subject is at endpoint E1. The group of interrogators includes group settings which are a collection of particular settings for each interrogator. In this example, two group settings are defined.

The first group setting includes: a setting for interrogator 30 associated with the reader 34 where the antenna is oriented at a 45 degree angle towards E1 as shown in FIG. 2B, with interrogator RF power output 27 dBm and antenna polarization circular; a setting for each interrogator 30 associated with the reader 32e where the antenna is oriented as shown in FIG. 2A, with interrogators RF power output 30 dBm and antenna polarization vertical. For this first group setting, the weight associated with the interrogator 30 associated with the reader 34 is W1,1=0.9 and the weights associated with interrogators 30 associated with the reader 32e(W1,2, W1,3, W1,4) are all 1 which means that all the reads from all the interrogators will count during the aggregation calculation for this group setting. The reference reading value for the interrogator 30 associated with the reader 34 configured with this group setting is C1,1=10. This is a high value because the antenna in this setting is circularly polarized and points directly toward E1 such that it detects tags located near E1. For the other three interrogators in the group configured with this group setting, the reference values are C1,2=10, C1,3=10 and C1,4=9. These are high values because these interrogators' antennas point toward E1 and detect tags located near E1.

The second group setting includes: a setting for the interrogator 30 associated with the reader 34 where the antenna is oriented as shown in FIG. 2A, with interrogator RF power output 30 dBm and antenna polarization vertical. The settings for the interrogators 30 associated with the reader 32e don't matter because these interrogators are associated with weights of 0 for this group setting and they don't count during the aggregation calculation of this group setting. For the second group setting, the weight associated with the interrogator 30 associated with the reader 34 is a lower value W2,1=0.4 because the interrogator settings allow detection in an area away from the E1 location and the weights associated with the interrogators 30 associated with the reader 32e(W2, 2, W2,3, W2,4) are all 0.9 which means that all the reads from the interrogators 30 associated with the readers 32e will count during the aggregation calculation for this group setting. The reference reading value for the interrogator 30 associated with the reader 34 configured with this group setting is C2,1=0. This is a low value because the antenna in this setting is vertically polarized and points in a direction away from E1, such that it detects tags located away from E1. For the other three interrogators in the group configured with this group setting, the reference values are C2,2=10, C2,3=10 and C2,4=9. These are higher values because these interrogators' antennas point toward E1 such that they detect tags around EP1. In this example, all the interrogators' antennas have a fixed gain of 6 dBi.

In an interval of time, such as 1 ms for example, the system collects data from both group settings: for the first group setting the number of reads at the interrogator 30 associated with the reader 34 is N1,1=2 and for each interrogator 30 associated with the reader 32e, the number of reads are N1,2=0, N1,3=1, N1,4=2 respectively. For the second group setting, the number of reads at the interrogator 30 associated with the reader 34 is N2,1=10 and for each interrogator 30 associated with the reader 32e, the number of reads are N2,2=0, N2,3=1, N2,4=2 respectively.

For each group setting, the system aggregates the values using an aggregation function. The aggregation function(F) for each group setting for this example is the average of the weights applied to the probability that the tag is at the endpoint E1 for each interrogator setting. The probability that the RFID tag is at endpoint E1 for each interrogator configured with the group setting is computed based on a probability function P(N, C) which in this example is: for the first group setting of the interrogator 30 associated with the reader 34(P1,1)={0 if N=0, C/N if N>C, N/C if N<=C}; for the second group setting of the interrogator 30 associated with the reader 34 (P2,1)={0 if N>C, 0.5 if N<=C}; and for all the interrogators 30 associated with the reader 32e group settings (P1,2, P1,3, P1,4, P2,2, P2,3, P2,4)={0 if N=0, C/N if N>C, N/C if N<=C}.

For the first group setting, the aggregate value becomes A1=(W1,1*P1,1+W1,2*P1,2+W1,3*P1,3+W1,4*P1,4)/4= (0.9*2/10+1*0/10+1*1/10+1*2/9)/4~0.52/4=0.13. For the second group setting, the aggregate value becomes A2=(W2,1*P2,1+W2,2*P2,2+W2,3*P2,3+W2,4*P2,4)/4=(0.4*0+0.9*0/10+0.9*1/10+0.9*2/9)/4~0.29/4~0.07. The final aggregation function (G) for this example is the average of the group settings' weights applied to the aggregated values for each group setting from the previous step. The first group setting is assigned a weight of WA1=0.9 while the second group setting is assigned a weight value of WA2=0.8. Any weight might have a positive or negative value in other examples.

The final aggregate value becomes A=(WA1*A1+WA2*A2)/0.2=(0.9*0.13+0.8*0.07)/2~0.087. This value is compared with a previously defined threshold value Tv=0.50 which is assigned to E1. In this example, the threshold value is not reached which means that the subject is not at endpoint E1.

For each of the weighting formulas above, the weights are numerical values (real numbers). Any of the weights might have a positive or a negative value. An example of an aggregation function (F or G) is a sum of weights applied to each number to be aggregated Funct(Wn, Nn)=SUM(Wn*Nn) where n is an integer. Another example of an aggregation function(G) is an average of weights applied to each number to be aggregated Funct(Wn, Nn)=SUM(Wn*Nn)/M where n is an integer spanning from 1 to M. Although specific values have been used in the examples above, it should be understood that the system is not limited to using the example values.

In an example embodiment, the system 20 is dynamically configurable to allow a system administrator, for example, to define intervals of time in which RFID tag reading at one or more endpoints is performed in a manner that is different then the manner in which RFID tags are read at the identified endpoints during other time intervals. This functionality can be used to provide more stringent security settings at differing times of day. The system adjusts the RF settings of the endpoint's RF interrogators and their associated weights to values that correspond to a desired level of RFID tag reading performance. As an example, for an endpoint used to read RFID tags for access to a building or room during off hours, the system settings may have high weights for settings corresponding to low transmitted RF output power, low antenna gain, and linear polarization of external interrogators at building access locations, but very low or null weights for other settings. This results in RFID tags being sensed at a shorter range during the off-hours interval than during the regular hours interval and requires a close proximity of an RFID tag to an external antenna before access is allowed. In one example, an RF signal strength setting is adjusted based on the received time interval and associated security level setting. In some embodiments, the time interval and associated security level setting may be entered once and kept in a system configuration. In other embodiments, the time interval and associated security level setting may be changed by the system administrator or other authorized users.

In one example, a system administrator defines a first regular-hours interval of time from 8 am-8 pm, a second off-hours interval from 8 pm-10 pm and a last interval from 10 pm to 8 am when no access is allowed. The system settings for the off-hours interval have high weights for settings corresponding to low transmitted RF output power, low antenna gain, and linear polarization of external interrogators at building access locations but very low weights or null weights for other settings. This results in RFID tags being sensed at a shorter range during the off-hours interval than during the regular-hours interval and requires a close proximity of an RFID tag to an external antenna before access is allowed. Alternatively, the system settings may be set such that RFID tags are more easily sensed at a longer range during the off-hours interval than during the regular-hours interval. This could possibly be desirable if an entrance were located such that many people with RFID tags pass by the entrance during the regular-hours interval without having an intention of entering, but people with RFID tags after-hours generally pass through the entrance if they are detected nearby.

As discussed above, a monitored area is modeled as a hierarchical spatial graph with nodes and oriented links with each node representing a spatial location. The system infers the location and direction of movement of an object using algorithms, some of which are threshold calculations. Set forth below are some alternate versions of the invention to achieve these goals.

In some instances, there is a close relationship between the location determination and access rights provided by the system to a tracked tag at a point in time. A subject is allowed to perform certain activities based on his location and path identification, but may be restricted from performing other activities based on his location and path identification.

In certain examples of the invention as described above, location determination was based on threshold limit calculations. In another example, location is determined based on the number of interrogators or antennas that can read a tag at a given point in time. This example may be referred to in this specification as the rule of minimum visibility, or RMV. In accordance with this example, the system infers that a tag is at a given location if it is visible (that is, can be read) by a specified minimum number of interrogators or antennas from within a defined group of interrogators or antennas, within a specified interval of time. In a preferred form, the specified time interval will be an endpoint delay interval and will be derived as a function of reader processing times associated with particular interrogator hardware.

As an exemplary implementation with respect to FIG. 2A, a tag 70 may physically be present at location E1. The interrogators 30 associated with the relevant readers 32e, 34 are used to determine whether the tag is at the endpoint E1. For this group of interrogators, the system may define the threshold as a minimum of two interrogators that must read, or see, the tag within the endpoint delay interval in order to conclude that the tag is at endpoint E1. Thus, the tag is considered to be at endpoint E1 if the tag is read at least once from at least two interrogators 30 within this group and further if the delay between the tag reads is less than the endpoint delay. In a preferred example, the endpoint delay is less than or equal to 500 ms.

This algorithm may be implemented in a system such as that depicted in FIG. 1. In such a system, the algorithm may be stored within the memory 40 and operated by the processor 38 (and/or more locally stored and processed in concentrators 46a and 46b in a distributed system as described above). The storage device 42 or memory 40 of the computer 36 may further store tag reads associated with an endpoint such as E1, E2A, or others. When a tag is read by interrogators the system adds the record to the cache (or other form of memory), noting the reading and an indication of time. The system then accesses the cache to review for previously stored reads related to the same tag to determine whether other interrogators within the predefined group associated with a particular endpoint have read the same tag within the endpoint delay interval. If so, the system indicates the tag as being present at the appropriate endpoint (e.g., E1) and proceeds with other processing. If desired, earlier stored readings for the particular tag may be deleted from the memory once a tag location is determined.

In a further version of the invention, the system may incorporate additional techniques to improve location accuracy and reduce noise and multipath propagation. In this version, once a tag is identified as being present at an endpoint (based on one of the above localization algorithms or any other means), all other stored tag readings in the memory that are related to that tag, recorded at a time prior to the localization determination, and associated with out of range endpoints other than the determined endpoint are deleted or indicated as invalid. This algorithm seeks to eliminate stray tag reads that are likely to be out of range of where the tag is determined to be, thereby eliminating noise and reducing the possibility of erroneous location determinations.

The range used to determine the out of range endpoints can be predefined or determined dynamically based on a variety of factors such as an estimated speed of movement of the tag, reliable reading range of interrogators, and historical data collected for the subject tag or other tags. With respect to historical data, for example, the system may determine that the tag is present at a particular endpoint and because it historically has never been localized at a particular out of range endpoint (or is seldom there), all readings associated with the out of range endpoint are invalidated.

A related example of the invention employs a cost-based tag read elimination technique. In this version, the system invalidates tag readings having a "cost" greater than a defined threshold. Two endpoints in the network model can be connected through one or more paths. A path between two endpoints consists of one or more interconnected links whereas one endpoint is the source of a link in the path and the other endpoint is the destination of a link in the path. The cost of the path is computed based on the cost of the paths' links costs. As an example, In FIG. 5 a path between EP7 and EP10 consists of Link 9 and Link 14 and the cost of this path is computed based on the costs of these links. In the preferred example the path cost is equal with the sum of the costs of the links forming the path. The cost associated with a particular link may vary from tag to tag and from link to link, depending on a variety of factors. Likewise, the cost of a link can be statically defined or may be updated during runtime in order to take into account access control rules for the link and the tag. As one example with reference to FIG. 2A, suppose a tag 70 is present at endpoint E1 (as determined through an algorithm such as those described above) and that interrogators 26 associated with endpoint E2A are able to read the tag. The readings by interrogators associated with endpoint E2A may suggest that the tag has moved (or is moving) through Link 1 to endpoint E2A. But if the door 52 is known to be locked or the path through Link 1 otherwise cannot be traversed from endpoint E1, the "cost" associated with this link is very high or perhaps designated as infinite. Hence, the path between E1 and E2A consisting from Link 1 has a very high cost and if this cost is above a determined or preset threshold, the tag readings related to this path are invalidated (in this case the tag reads for endpoint E2A are invalidated). Similarly, if there were more paths between E1 and other endpoints that would have had a cost above the threshold then the tag readings for those endpoints would have been invalidated.

The above cost levels may vary from tag to tag and from link to link. For example, the door 52 may be access controlled such that a subject associated with a particular tag is denied access, thereby producing a very high cost associated with that link and tag. But a different subject may be authorized access to the door, thereby providing a very low cost associated with that link and the different tag.

In addition, the tag costs and thresholds may be predetermined or set dynamically based on historical or current movements and speeds of the specific tag or other tags. Likewise, tag costs and thresholds may be set as a function of access control rules or other expected environmental changes over time.

In a similar version of the invention, the system monitors the paths that are available to particular endpoints. For example, with respect to FIG. 3, endpoint EP4 includes Link 5 and Link 6 that are tied to endpoint EP2. There is no path, however, from endpoint EP4 to endpoint EP3. In one version of the invention, when the tag is determined to be present at EP4, tag readings associated with EP3 are invalidated because there is no path between those endpoints.

A further example of the invention enhances location estimation ability by incorporating previous travel paths taken by the subject tag. In implementation of this example, the system infers possible paths for the moving subject based on prior links traversed by that subject, preferably using the greatest frequency of traversing a particular link to conclude that the commonly traversed link will be traversed again. Over time, the estimation settings are adjusted to account for the previous user path information. For example, in a system using a cost based tag read elimination, the cost associated with a particular link is adjusted upward over time as the frequency that the tag traverses that link is reduced. Additional factors such as the estimated speed of movement of the same tag or related tags and the historical path of travel may also be used.

In some versions, the system incorporates additional external information to aid in determining locations and the validity of readings. For example, with reference to FIG. 3, a subject may indicate that it is at location EP4, perhaps because it is in a meeting in the room associated with EP4. The presence of the subject at EP4 may be indicated other than by tag readings, for example, because a scheduling calendar indicates that the subject will be present in the meeting at EP4 at a particular time. The system will then adjust its settings to account for the external data. As one example, the cost associated with links suggesting that the subject has left the room will be increased during the time the subject is expected to be in the room at EP4.

The system tracks tag readings and stores them in memory together within an indication related to the time at which the reading was taken. The system also stores tags' path of movement including links and endpoints and related information as timestamps.

Another version of the invention validates the passage of a tag through a given link only if the tag traverses the link within a maximum passing time. In this case the system concludes that a tag has traversed a particular link only if the time difference between the time when the tag is localized at the link's destination endpoint and the time when the tag was localized at the link's source endpoint is within a defined interval.

If there are no records of the tag being localized at an endpoint or these records are older than a defined time threshold the system may conclude that the subject didn't pass any of the links originating from the endpoint.

The system may employ additional rules to improve the detection of a tag's traversed link; only the links that are reachable based on the tag's path of travel are considered eligible; if the source endpoint of a candidate link is not reachable from the previous identified link in the path then the link is not a good candidate and is eliminated from the candidates.

Using a similar technique as above the system may improve an endpoint localization algorithm accuracy. In this case, a tag is considered localized at an endpoint only if the endpoint is reachable from the previous identified endpoint in the path through a direct link. As an example in FIG. 3 let's assume that the subject moved from EP4 through EP1 via a path consisting of Link 6 and Link 2. However, using the localization techniques, the system might find as possible location candidates EP1 and EP3. However, since the last identified endpoint in the path was EP2 and there is no direct link between EP2 and EP3 the system should eliminate EP3 (false positive) from candidates.

In order to reduce interference between readers, in some examples of the invention the system activates the tag readers on an "as needed" basis based on similar algorithms used for tag read eliminations. For example, when the system identifies the tag at an endpoint it may activate tag readers (or antennas or interrogators) associated with endpoints that are connected with the current endpoint through a path with a cost less than a cost threshold. Readings by readers through paths above the threshold are considered to be false and the result of noise, reflections, multipath, or other issues. In another example the system activates the hardware associated with endpoints that are connected through a direct link or path with the current endpoint. In either case, the hardware associated with endpoints to which the tag is likely to travel are activated while the others are not.

Similarly the system may deactivate the tag readers based on similar algorithms used for tag read eliminations. When the system identifies the tag at an endpoint it may deactivate tag readers/interrogators/antennas associated with endpoints that are connected with the current endpoint through a path with a cost greater than a cost threshold. Likewise, it may deactivate the hardware associated with endpoints that are not connected through a path with the current endpoint.

One or more of the links in the model may have access control rules associated with them. As an example of an access control rule, Link 5 in FIG. 3 may be available for passing only between 8:00 a.m. and 8:00 p.m. each day, and only by valid tags. When the system detects a tag at an endpoint it checks all the related links that originate from that endpoint and opens or closes the lock associated with the link accordingly.

Certain versions of the invention infer the subject's actions based on path identification and location in order to improve security, enforce access rules, and infer semantic events. A reversed path access control technique may be used to aid in these objectives. Using this technique, the system ensures that the security and access control of the reversed path of traveling is minimally influenced during the subject's presence in the reader's field of view. For example, when a subject tag passes a link in a first direction (e.g., Link 6) and is identified as being present at a destination endpoint, the opposing links (e.g., Link 5) are closed to the subject for a specified period of time referred to here as the reverse path delay time. With reference to FIG. 3, for example, the movement of a tag from EP4 through Link 6 will close access through the door 82 and Link 5 for that tag until the reverse path delay time has expired. This aspect of the system improves access control by not allowing unauthorized subjects to gain access to the reverse path (for example, Link 5 access to the room at EP4) by using the credential of an authorized subject.

A system based on the above techniques may aggregate one or all of them in a single system. Thus, the system includes the ability to store, filter, and aggregate the RFID collected data and store them in memory. When a tag is read by one of the interrogators, the system stores the readings and continually analyzes the readings against the algorithms discussed above. For each endpoint the system uses one or more of the above localization algorithms to determine the location of a tag. As noted above, some of the stored data may be deleted or indicated as invalid in accordance with such determinations.

The system further iterates through the incoming links associated with the endpoint at which a subject is determined to be present. Where the rule of maximum passing time is employed, the system analyzes whether the rule is satisfied. If this rule or other applicable conditions are satisfied, the system will generate an indication that a particular link has been passed. The system will again delete or indicate as invalid any prior data recordings as appropriate.

Once a link has been passed and a tag is determined to be present at an endpoint, the system determines whether there are reverse path access control rules associated with that link and endpoint. Depending on the time intervals and the reverse access rules as applicable, the system will then lock or unlock the locking devices at the access control points for determined periods of time, as applicable.

In some cases, when a tag is present at an endpoint or traverses a particular link the system will prompt a localization or access event. For example, when a user is localized at an endpoint associated with an entry and exit to a building, the system may prompt the user (such as at a computer monitor at the access point) to provide an access code or provide other information. For instance, a worker may be prompted to indicate whether an exit is related to a scheduled break, sick time, end of shift, business, or some other reason. Tags associated with inventory likewise may require responses indicating delivery locations or particular intended uses for the inventory item once the item is detected at such endpoints. In either case, the responses to the prompt may be in the form of selection from a predetermined list of items, a calendaring or scheduling program, a manually entered statement, or other forms.

Some versions of the invention may also track a location bound subject list. In this case, when there is more than one subject identified as being present at a particular endpoint the user interface may display a list with all the subjects present at the endpoint. In this or other examples the user interface may be a computer monitor configured to display any of the data gathered and processed by the system, such as a monitor connected to a computer that is present on the network 44 depicted in FIG. 1. Through such an interface a user may select subjects at the particular location (such as items in inventory) and designate particular actions for those subjects (such as shipment to a destination). Possible actions may be added or removed from the listing at any time.

From time to time the listing of subjects designated as being present at a particular location is updated. In some instances the listing is updated because the system has detected that the subject is present at a different endpoint and therefore is not present at the listing endpoint. In other cases a timeout may be used to remove the subject from the list. A periodic comparison of the age of the localization determination for the subject against a specified timeout value enables the system to determine which subjects should be removed from the location bound subject list based on the timeout rule. If the localization tag readings are older than the timeout rule, the subject item is removed from the list. In such a system, a localization timestamp associated with each subject should be updated each time the system determines that the subject is present at a particular location.

Depending on whether the localization infrastructure allows very fine localization of a subject, the system may further allow precise identification of a subject tag at an endpoint and can determine actions associated with the individual subject tag at that location. In such cases the system may further store in memory a listing of actions taken by the subject tag at the endpoint or other location. Such listing may likewise be updated based on location and timeout values.

While the preferred embodiment of the invention has been illustrated and described, as noted above, many changes can be made without departing from the spirit and scope of the invention. For example, functions performed by the computer 36 may be performed in a distributed manner in other embodiments, making use of various combinations of computers embedded within the concentrators and the RFID readers themselves. Further, the above description relates to a variety of hardware and software functions and components to accomplish those functions. In many cases, components that are described as hardware in a preferred embodiment may be replaced by software capable of performing the function of the hardware, and vice versa. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A radio frequency identification system comprising:
   a first location-based endpoint and a second location-based endpoint, each of the endpoints having associated with it one or more radio frequency identification (RFID) tag readers;
   a computer in signal communication with the RFID tag readers;
   a memory associated with the computer, the memory storing data indicating that an RFID tag has been read by the RFID tag readers;
   a software module for storage on and operable by the computer, the software module including programming instructions causing the computer to determine that the tag is present at the first endpoint at a first time and to validate or invalidate a reading by the RFID tag readers that the tag is present at the second endpoint at a second time, wherein the validation that the tag moved from the first endpoint to the second endpoint is only made by the software module when the difference between the first time and the second time is within a specified interval, whereby the software module invalidates a reading that the tag is present at the second endpoint despite if the difference between the first time and the second time is less than a lower end of the specified interval; and
   a first link defining a first path from the first endpoint to the second endpoint, wherein the software module determines that the tag has traversed the first link when the difference between the second time and the first time is less than the upper end of the specified interval.

2. A radio frequency identification system comprising:
   a plurality location-based endpoints, each of the endpoints having associated with it one or more radio frequency identification (RFID) tag readers, each of the endpoints further having one or more links defining paths of travel between endpoints, each of the links having a specified cost for a tag to traverse the link;
   a computer in signal communication with the plurality of RFID tag readers;
   a memory associated with the computer, the memory storing data indicating that the RFID tag has been read by one or more of the RFID tag readers; and
   a software module for storage on and operable by the computer, the software module including programming instructions causing the computer to determine that the tag is present at a first one of the plurality of endpoints, and further to treat as invalid previously stored data indicating that the tag has been read by tag readers at a second one of the plurality of endpoints if a specified cost for a path between the first endpoint and the second endpoint exceeds a specified cost threshold.

3. The system of claim 2, wherein the specified cost for the links of a path between the first endpoint and the second endpoint is established dynamically.

4. The system of claim 2, wherein the specified cost for the links of a path between the first endpoint and the second endpoint is based on historical data related to the movement of the tag.

5. The system of claim 2, wherein the specified cost for the links of a path between the first endpoint and the second endpoint is related to access control settings.

6. The system of claim 2, wherein the specified cost for the path between the first endpoint and the second endpoint is a function of a number of links between the first endpoint and the second endpoint.

* * * * *